United States Patent [19]
King

[11] Patent Number: 5,964,332
[45] Date of Patent: Oct. 12, 1999

[54] REAR HUB DRIVE ENGAGEMENT MECHANISM

[76] Inventor: Christopher D. King, 503 Consuelo Dr., Santa Barbara, Calif. 93110

[21] Appl. No.: 08/919,417

[22] Filed: Aug. 27, 1997

Related U.S. Application Data

[60] Provisional application No. 60/025,830, Sep. 5, 1996.
[51] Int. Cl.$^6$ .............................. F16D 23/00; F16D 11/00
[52] U.S. Cl. ................................................ 192/64; 192/46
[58] Field of Search .......................................... 192/64, 46

[56] References Cited

U.S. PATENT DOCUMENTS

| | | | |
|---|---|---|---|
| 2,181,242 | 4/1937 | Kurzina, Jr. | 192/64 |
| 3,010,553 | 11/1961 | Van Der Plas . | |
| 3,306,409 | 2/1967 | Gionetti | 192/46 |
| 3,319,755 | 5/1967 | Digby | 192/46 |
| 3,458,019 | 7/1969 | Fant et al. | 192/46 |
| 4,261,452 | 4/1981 | Barrows | 192/46 |
| 4,353,447 | 10/1982 | Bes | 192/694 |
| 4,461,375 | 7/1984 | Brown . | |
| 4,593,799 | 6/1986 | Ozaki . | |
| 5,125,489 | 6/1992 | Cha . | |
| 5,136,892 | 8/1992 | Ochs . | |
| 5,515,957 | 5/1996 | McConaghy . | |
| 5,518,096 | 5/1996 | Lin . | |

FOREIGN PATENT DOCUMENTS

| | | | |
|---|---|---|---|
| 445759 | 4/1936 | United Kingdom | 192/64 |

OTHER PUBLICATIONS

A DT Hügi™ swiss made Bicycle Hub Brochure entitled "No compromises," (DT Swiss Bike Technology, undated, 4 pp).

*Primary Examiner*—Charles A. Marmor
*Assistant Examiner*—Roger Pang
*Attorney, Agent, or Firm*—Baniak Nicholas Pine & Gannon

[57] ABSTRACT

An engagement mechanism is provided within the rear hub of a bicycle to allow drive sprockets attached to the rear hub to transmit drive motion from the crankset to the rear wheel. The assembly uses a pair of engaging face gears with saw tooth-shaped teeth to accomplish the torque transfer/freewheeling. While one gear is in a fixed axial position, the other is allowed to move axially along a helical spline. A light spring backs up this moveable gear to hold it against the other. When the moveable gear is rotated in one direction, the teeth having their faces parallel to the axis push against each other squarely, transferring the rotating motion from one to the other. Yet in the other direction of rotation, the faces of the teeth are askew to the axis forming ramps by which the fixed gear pushes the moveable gear away from it along the axis. This allows the teeth of the moveable gear to jump over the teeth of the fixed gear causing no rotating force to be transferred to the other and thus freewheeling. The helical spline acts like a screw thread; in the engaging direction of rotation, it pulls and clamps the movable gear to the fixed gear. Once engaged, the helix continues to apply force to hold the two gears together. Because of this effect, the teeth of the gears can be made very small allowing upwards of 100 engagements per turn and of lighter materials such as aluminum rather than steel.

28 Claims, 2 Drawing Sheets

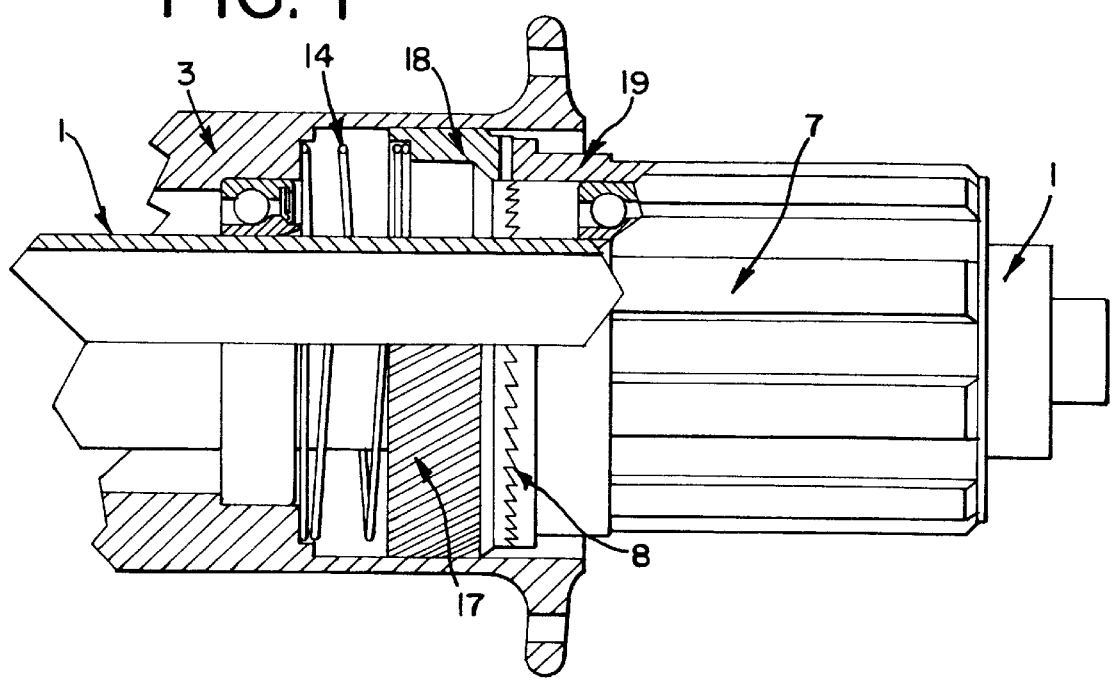
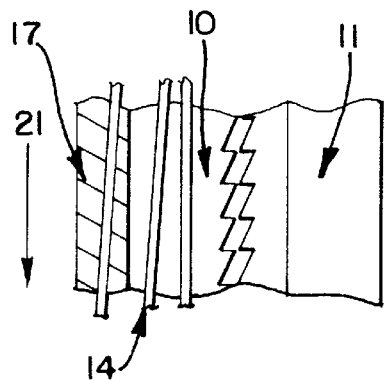 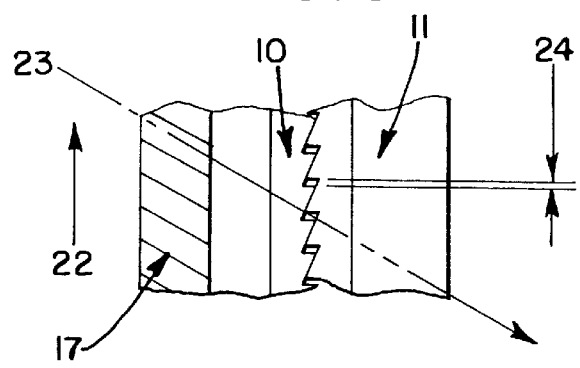

REAR HUB DRIVE ENGAGEMENT MECHANISM

This application claims priority to U.S. Provisional Application No. 60/025830, filed Sep. 5, 1996.

FIELD OF THE INVENTION

This invention relates in general to single or multi-speed bicycles where it is desirable to allow the wheel to freewheel, or spin freely, while not applying power from the pedal-crank assembly. More specifically, the invention relates to an improved rear hub drive engagement mechanism.

BACKGROUND OF THE INVENTION

For quite a long period it has been conventional to employ a free-wheeling device in connection with, or as a part of, a rear wheel. This allows the rider to coast the cycle without continuing to turn the pedals. Freewheeling became a necessary part of the overall drive train design when multiple rear sprockets and a chain derailleur were employed to achieve multi-ratio speed selection.

Until the last ten years, the hub portion of the rear wheel was composed of two separate assemblies; the hub body, a shell with flanges and spoke holes, two bearings mounted inside, and an axle running through the middle; and a freewheel, composed of the multiple sprockets and a one way rotation device. The freewheel was attached to the hub by means of a standard threading, allowing for interchanging in case of repairs or replacements.

More recently, the freewheel and the hub body were integrated into one unit or "freehub". As a part of the one way device, this unit had a single, external splined diameter on the drive side of the hub by which a group or "cassette" of sprockets having a matching splined hole could be mounted. This arrangement allowed for much quicker changing of selectable gear ratios.

Whether it be the older screw-on type freewheel or the newer freehub, the one way device is conventionally of the ratchet and pawl design. This design has been the preferred type because of its positive engagement, and relatively simple and inexpensive construction. However, the small number of pawls that can fit into the confined space within the ratchet ring requires the turning energy to be transferred through a minimal amount of material and surface area. Because of this, it is essential that the pawls, pawl nest component, and the ratchet ring be made of hard steel. The coarseness of the teeth on the ratchet ring must also be maximized to maintain a maximum amount of force bearing surface for the pawls to push on once engaged. Both the weight of the steel pieces and coarseness of the ratchet teeth have become obstacles in the path of freewheel improvement.

Weight savings is commonly a paramount subject in bicycle design and thus needless to talk about here. However, the coarseness of the ratchet teeth is worth exploring. Through the course of bicycle history, the significance of how quickly a freewheeling device engages has never been realized. Until the development and popularization of the "Mountain Bike" or multi-terrain cycle, bicycling technology has been quite content with the engagements per turn of the typical pawl and ratchet freewheel. Today's off road cycling sports has quite different needs. The typical mountain bike has gearing or final drive ratios that are far lower than bicycles in the past. In its lowest gear, pedal movement of over 2 inches may be experienced while waiting for a typical pawl and ratchet freehub to engage. The importance of quickness of engagement is experienced while riding up a steep trail and having to reposition your pedals to miss hitting a rock or root and then continue to pedal to keep forward momentum. Having a freehub that engages more rapidly improves the connection of pedal power to the rear wheel thus not losing precious momentum. Other advantages become clear when thinking about not losing time when connecting power to the rear wheel.

More recently, friction clutch devices such as pin-roller, ball, or sprag etc. were employed to take the place of the pawl and ratchet system. Although having the advantage of near instantaneous engagement, they suffer from a side effect of the clutch devices: while generating the necessary friction to transfer torque through them they produce very large amounts of radial force. In turn, this radial force must be contained within the assembly in order for the clutch to produce the necessary friction to transfer the torque. It is the containment of this radial force that condemns this design. Either the clutch has to be contained in, or made of, a large mass of heavy steel or the clutch will not be able to generate enough friction to handle the large amounts of torque generated by low final drive gearing.

SUMMARY OF THE INVENTION

The present invention provides a multitude of advantages over pre-existing designs. The engagement design of the invention uses a pair of engaging face gears with saw tooth-shaped teeth to accomplish the torque transfer/freewheeling. While one gear is in a fixed axial position, the other is allowed to move axially along a helical spline. A light spring backs up this moveable gear to hold it against the other. When the moveable gear is rotated in one direction, the teeth having their faces parallel to the axis push against the matching teeth of the fixed gear squarely, transferring the rotating motion from one to the other. Yet in the other direction of rotation, the faces of moveable gears away from it along the axis. This allows the teeth of the moveable gear to jump over the teeth of the fixed gear causing no rotating force to be transferred to the other and, thus, freewheeling.

Because of the nature of engaging face gears, when engaged, all the teeth are engaged. The total accumulated amount of force bearing tooth surface far exceeds that of any pawl and ratchet that can be fit into the same restricted space. Because the load of torque is spread over so much more bearing surface, the gears can be made of lighter materials such as aluminum rather than steel.

The helical spline acts like a screw thread; in the engaging direction of rotation, it pulls and clamps the moveable gear to the fixed gear. Once engaged, the helix continues to apply force to hold the gears together. Because of this effect, the teeth of the gears can be made very small allowing upwards of 100 engagements per turn.

The helical clamping movement of the face gear and the enormous amount of bearing surface of face gears themselves work together to provide a freewheeling engagement mechanism that not only is very light and economical to construct, but also very strong and extremely quick acting to meet the demands of modern cycling.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 4 shows an enlarged partially cutaway side view of a freehub with another possible configuration of the invention;

FIG. 5 shows a portion of the engaging face gears as found in FIG. 3, turning motion being applied, and the path of disengagement as they move apart; and FIG. 6 shows a portion of the engaging face gears as found in FIG. 3, turning motion being applied, and the path of re-engagement as they move back together.

DETAILED DESCRIPTION OF THE PRESENTLY PREFERRED EMBODIMENTS

Figure 1:
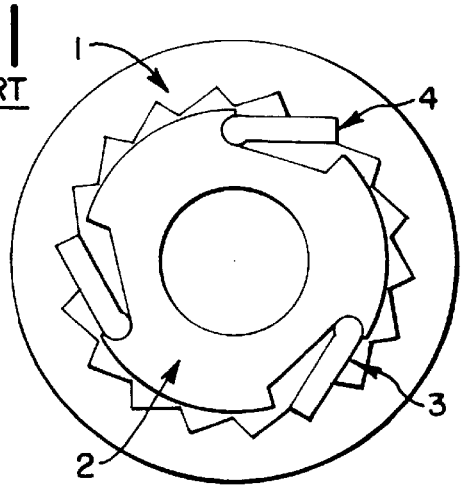
FIG. 1 shows an end view of a typical prior art pawl and ratchet one way rotation transfer device.
Figure 2:
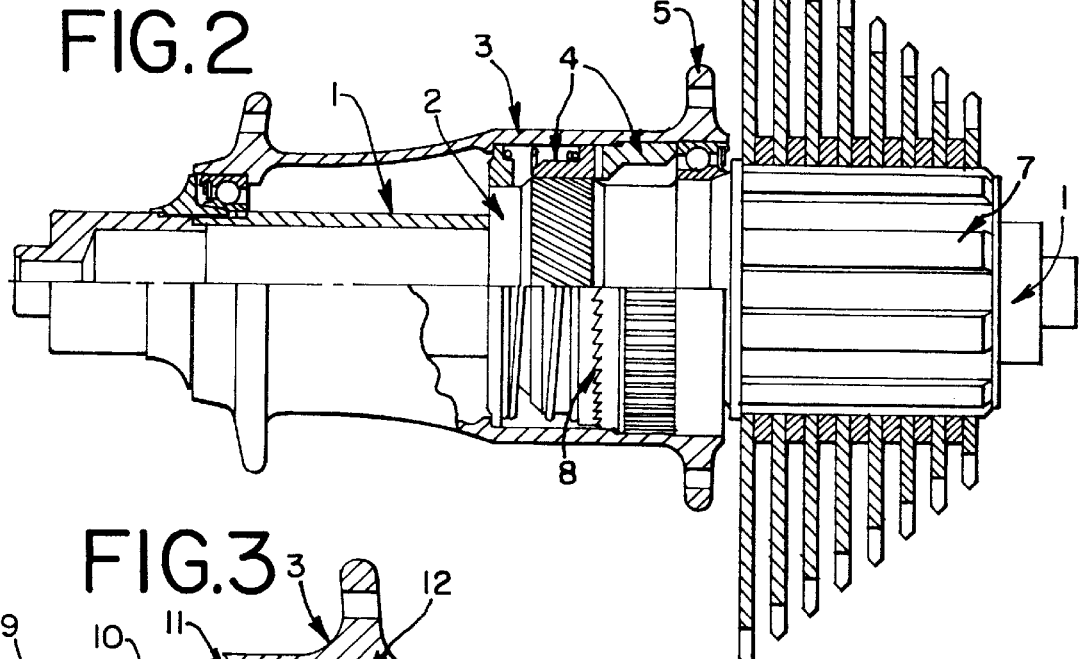
FIG. 2 shows a partially cutaway side view of the invention in the preferred embodiment as found in a "freehub" or hub with integral one way rotation device. This view includes sprockets as they would be mounted on the input shaft of the freehub.

The "freehub" in which the rear hub drive engagement mechanism is incorporated with the rear hub of a bicycle is shown in FIG. 2. However, the invention is not limited to the construction applied to the freehub only, but also is applicable to the freewheel formed separately from the rear hub when screwed thereon.

Referring first to FIG. 2, the engagement mechanism is located within the body of a freehub. A common axis, being shared by all parts of the assembly, is defined by the center-most line running through the length of the axle 1. Multiple sprockets 6 are mounted to an input shaft 2 and located rotationally by splines 7 as made a part of the input shaft 2. As power is transmitted from a roller chain (not shown), to the one of multiple sprockets 6, a rotating motion is applied to the input shaft 2. The input shaft 2 is allowed to spin freely on a common axle 1 by a bearing means mounted commonly between the two, carried inboard on the input shaft 2 is one of two engaging face gears. 4, having matching saw tooth-shaped teeth 8, the other is located adjacently and affixed rotationally to the outer hubshell 3. Rotating motion will be transmitted from the input shaft 2 through the face gears 4 to the outer hubshell 3 and thus carried to the rest of the wheel by spoke means located and affixed to the hubshell 3 through holes 5.

Figure 3:
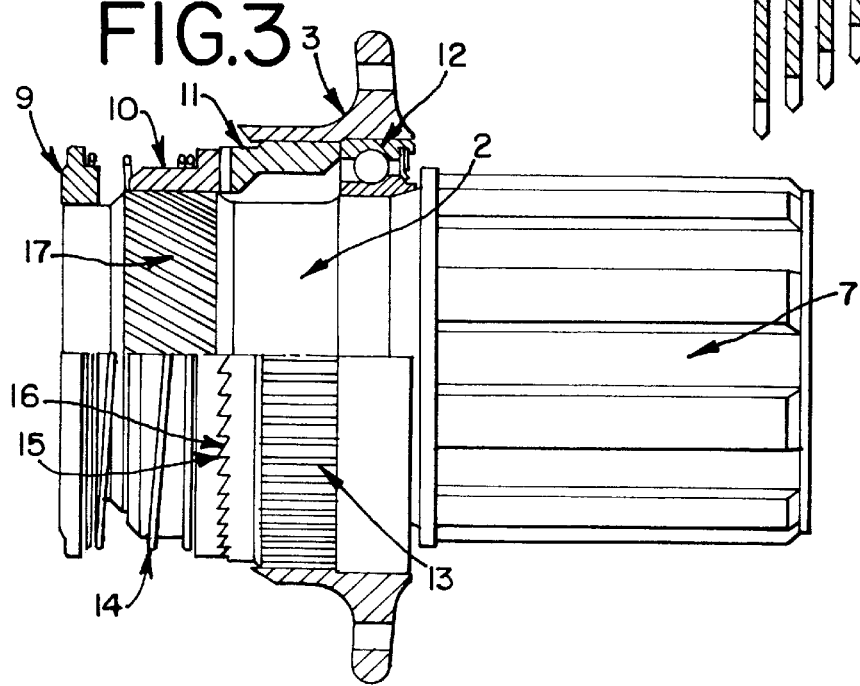
FIG. 3 shows an enlarged partially cutaway view detailing the invention as found in FIG. 2.

FIG. 3 shows in more detail how the rear hub engagement mechanism works. The input shaft 2 has a section of its outer diameter forming a set of helical spline teeth 17, and, encircling it over the same section is a drive ring 10 having the matching helical-spline on its inside diameter. The helical spline within the drive ring 10 is of a running fit to that of the matching spline 17 of the input shaft 2, allowing the drive ring 10 to move axially along the spline 17 of the input shaft 2. As the drive ring 10 moves axially along the input shaft 2, a slight rotating motion relative to the input shaft 2 is induced. The significance of this induced rotating motion will be explained later.

Disposed radially about one face of the drive ring 10 are saw tooth-shaped teeth. One face 15 of a tooth creates a plane running parallel to the common axis of the assembly, the other face 16 creates a plane running askew to the same common axis. Directly adjacent to the toothed face of the drive ring 10 is a driven ring 11, having an interlocking or meshing set of saw tooth-shaped teeth disposed about its face facing the drive ring 10. Disposed about the circumference of the driven ring 11 is a spline means 13 to locate the driven ring 11 radially within and to lock it rotationally to the hubshell.

A coil spring 14, retained from one side axially by a retaining ring 9 affixed to the input shaft 2, is used to push the drive ring 10 axially along its running fit to the spline 17 of the input shaft 2, and keep it pushed up against, and meshed with, the driven ring 11.

As the drive ring 10 is rotated in one direction by the input shaft 2, its tooth faces 15, forming parallel plains to the common axis, push directly and squarely with the tooth faces 15 of the driven ring 11. The driven ring 11 is interlocked and thus caused to rotate with the drive ring 10. The rotation of the driven ring 11 in turn, rotates the hubshell 3. Input rotation of the input shaft 2 is carried through the invention to the hubshell 3 and thus to the wheel as output rotation.

When the input shaft 2 rotates the drive ring 10 in the opposite direction, the tooth faces 16 of the driven ring 11, their faces forming plains askew to the common axis, act as ramps by which the matching faces of the drive ring 10 begin to slide up and move the drive ring 10 axially away from the driven ring 11 along the splines 17 of the input shaft 2. Once rotation has moved the parallel tooth faces 15 to the place of being lined up with the next set of teeth on the driven ring 11, the axial force from the coil spring 14 pushes the drive ring 10 back along its spline, causing the ramped faces to meet the next set of ramped faces of the driven ring 11. With continuing rotation, the action described is repeated over and over again displaying a motion of the drive ring 10 teeth jumping over the teeth of the driven ring 11. No rotating motion will be transferred to the driven ring 11 as the drive ring 10 allows the input shaft 2 to rotate freely or "freewheel".

At any point, if the rotation is reversed again, and the parallel faces 15 of both rings 10 and 11 do not currently meet, axial force from the coil spring 14 will keep the ramped faces 16 together as they slide down each other, the drive ring 10 moving closer axially to the driven ring 11 until the parallel faces 15 meet once again. At this point, rotation will again be transferred from the drive ring 10 to the driven ring 11, resulting finally as output rotation to the wheel.

As mentioned earlier, the invention utilizes a helical engagement path of the axially floating drive ring 10. A description of this and its significance is as follows:

While a rotation of the input shaft 2 is in the non-freewheeling direction (the direction in which the parallel teeth 15 of the drive ring 10 force the matching teeth of the driven ring 11 and, thus, the hubshell 3 to rotate with it), the helical spline 17 of the input shaft 2 acts with the matching spline of the drive ring 10 to produce an axial movement or force. This force, while in the current direction of rotation, pushes the drive ring 10 into the driven ring 11. The driven ring 11 is backed up axially by a bearing means 12 which, in turn, is fixed axially to the input shaft 2. The circle of axial force is contained to produce a dynamic clamping affect, holding the drive ring 10 and the driven ring 11 together while transferring rotational motion. The more rotational force applied by the input shaft 2 and/or the more resistance to rotation of the hubshell 3, the more clamping force generated to hold the drive ring 10 and the driven ring 11 together. This is important for maximum longevity of the engagement teeth. Maintaining the full tooth contact of the parallel driving tooth faces 15 maintains the maximum load bearing surface to transfer the rotational force from drive ring 10 to driven ring 11.

The clamping force also minimizes the spring force necessary from the coil spring 14, in turn reducing friction and wear of the teeth between the drive ring 10 and the driven ring 11 as the teeth slip across each other during the freewheeling direction of rotation.

To further the significance of the helical path of the drive ring 10 on the input shaft 2 it is important to look at the action during freewheeling and re-engagement. As shown in FIG. 5, during freewheeling, as the input shaft 2 and its helical spline 17 move in direction 21, the drive ring 10 is pushed away axially from the driven ring 11 as the ramping action happens between the engagement teeth. At the point of rotation where the teeth no longer touch with their ramped faces, as positioned in FIG. 5, they are ready to be pushed back together by the coil spring 14. Once back together, as shown in FIG. 6, the drive ring 10, having moved along the helical spline 17, created a tooth path as shown by arrow 23. Note the gap between the driving faces as measured by dimension 24. If the direction of rotation were reversed 22 while the teeth were being pushed back together, the gap 24, induced by the helical motion of the drive ring 10, would ensure that the teeth of drive ring 10 reach full depth of engagement before their driving faces meet. This effect prevents the possible occurrence of tooth tip engagement; the transferal of rotational force through only a portion of the total bearing surface of the driving faces. This is an advantage that figures prominently with fine tooth designs as well as with teeth of light material construction.

Another version of the invention as applied to a freehub is shown in FIG. 4. Here, the orientation of the parts vary from the previous, the principle, however, is the same. One of the two engaging face gears is made a part of, or fixed to, the input shaft 19. Again the input shaft rotates freely by bearing means on the common axle 1. The other matching face gear or driven ring 18 is located adjacent to the toothed face of the input shaft 19 and has matching saw tooth-shaped teeth 8 to mesh and engage with the teeth of the input shaft 19. The driven ring 18 has a helical spline 17 disposed about its outer circumference and is located radially and rotationally within a matching helical spline made as a part of the inner bore of the hubshell 3, in which the driven ring 18 is located. The location of the input shaft 19 and its toothed face is fixed axially while the matching driven ring 18 is allowed to moved axially along the matching spline of the hubshell 3. A coil spring 14 is retained axially by the hubshell 3 and applies its force axially against the driven ring 18 to hold it against the toothed faces of the input shaft 19.

The engagement of teeth of the input shaft 19 and driven ring 18 to transmit rotational motion is the same as the previous version. In one direction, the teeth of the input shaft 19 meet squarely with the teeth of the driven ring 18 to transfer rotation. In turn, the hubshell 3 rotates with the driven ring 18. In the other direction of rotation, the teeth of the driven ring 18 move up the ramps of the teeth of the input shaft 19 and continually jump to the next set of teeth. No rotation is transferred, as the input shaft is allowed to freewheel.

The helical engagement motion is induced as the driven ring 18 moves axially within the hubshell 3, the driven ring's helical spline 17 being guided by the matching helical spline of the hubshell 3. While rotational motion is being transferred from the input shaft 19 through the driven ring 18 to the hubshell 3, the helical engagement motion of the driven ring 18 pushes from the hubshell 3 to force it against and hold it securely to the face of the input shaft 19. The input shaft 19 is fixed axially by bearing means to the common axle 1 as is the hubshell 3. The circle of force is completed to support the clamping action of the driven ring 18 to the face of the input shaft 19.

Here again the helical engagement path offers all the same advantages to this version as it did to the first.

As with the embodiments described, as well as other possible embodiments, the helical movement of the engaging face gear is critical to the engagement mechanism and at the heart of this invention. The motion it induces and the resulting tooth path during engagement, disengagement, and reengagement, the creation of clamping action and the prevention of tooth tip engagement are all fundamental properties necessary in order to utilize light materials in the construction of the engagement components.

The drive engagement mechanism of the invention enjoys several advantages over the prior art. The design of the invention allows the use of light materials such as aluminum to be substituted for hard steel traditionally used in the construction of the one way motion devices found in bicycle freehubs or freewheels. Also, increased torque carrying capacity under dynamic loading due to the wedging effect of the face gears, not allowing the gears to come apart under load. Further, a much higher number of engagements per turn over the prior art due to the much smaller and finer engagement teeth allowable by the anti-tooth-tip engagement effect. For example, in the embodiments of FIGS. 3 and 4, there are 48 engagement teeth. The tips of the teeth would not be rounded off which, on a small tooth face, would sacrifice a major portion of the load bearing tooth surface. (More engagements means quicker response time at the pedal to engage drive power. This is a distinct advantage with the extremely low final drive ratios of mountain bikes, etc.). Additionally, fine teeth mean less wind up of momentum while waiting for the driving engagement faces to meet. This reduces dynamic impact strain on the load bearing engagement surfaces, thus, reducing possible failure and extending life to the mechanism. Overall, a bicycle embodying the invention is lighter, stronger, and more efficient with power, more responsive at lower speed and easier to handle than the prior art.

The invention has been shown in only two embodiments. It should be apparent to those skilled in the art that the invention is not so limited, but is susceptible to various changes and modifications without departing from the spirit of the invention. For example, in a multi-speed internally geared hub, a version of the invention could be employed to take the place of the pawl and ratchet devices currently used. Also, it could be utilized in single speed rear hubs. Variations are possible within its construction: a means other than a helical spline could create the helical engagement path. Other variations will be apparent to those skilled in the art.

It is to be realized that only preferred embodiments of the invention have been described and that numerous substitutions, modifications and alterations are permissible without departing from the spirit and scope of the invention as defined in the following claims.

I claim:

1. A drive engagement assembly for a bicycle comprising;
   an input shaft rotatably attached to an axle, the axle having a length, an axis being defined by the centerline running through the length of the axle;
   a first face gear and a second face gear, the first and second face gears each including at least 40 teeth, the first face gear operably attached to the input shaft, the second face gear operably attached to a hub member to allow rotational motion to be transmitted from the input shaft through the face gears to the hub member; and
   a spring for applying a force axially against one of the face gears to engage the first and second face gears.

2. The assembly of claim 1 wherein the teeth of the first and second face gears include a second face which is oriented to allow the teeth of the first and second face gears to disengage when the rotational motion is reversed.

3. The assembly of claim 2 wherein the second face forms a plane oriented askew to the axle.

4. The assembly of claim 1 wherein each of the teeth include a face defining a plane oriented parallel to the axis.

5. The assembly of claim 1 wherein the first face gear includes a helical spline formed thereon, and the input shaft includes a helical spline matching the helical spline of the first face gear to allow the first face gear to move axially along the input shaft.

6. The assembly of claim 1 wherein the input shaft and first face gear are formed as an integral member.

7. The assembly of claim 1 wherein the second face gear includes a helical spline formed thereon, a hubshell operatively attached to the hub member, and the hubshell includes a helical spline matching the helical spline on the second face gear to allow the second face gear to move axially along the hubshell.

8. The assembly of claim 7 further comprising a spring retained axially by the hubshell and applying a force axially against the second face gear.

9. A method of transmitting drive motion to a bike wheel comprising:
providing an input shaft rotatably attached to an axle, the axle having a length and an axis being defined by a centerline running the length of the axle rotating the input shaft in a first direction;
transmitting the rotation of the input shaft through first and second engaging gears, the first gear operably attached to the input shaft, the second gear operably attached to a hub member, the first and second engaging gears including at least 40 teeth;
rotating the hub member;
providing a spring, and applying a force axially against one of the first or second gears to engage both the first and second gears;
rotating the input shaft in a second direction which is reverse to the first direction; and
disengaging the first and second engaging gears.

10. A drive engagement assembly for a bicycle comprising:
an input shaft rotatably attached to an axle, the axle having a length, an axis being defined by a centerline running through the length of the axle, the input shaft including an outer section having a helical spline;
first and second rings having a plurality of engaging teeth, each of the engaging teeth having a drive face the first ring having a helical spline matching and aligned with the helical spline of the input shaft to allow the first ring to move axially and engage and disengage from the second ring, the second ring operably attached to a hub member; and
a spring for applying an axial force against the first ring.

11. The assembly of claim 10 wherein each of the teeth include a face defining a plane parallel to the axis.

12. The assembly of claim 11 wherein each of the teeth include a second face forming a plane askew to the axis to allow the first ring to disengage from the second ring.

13. The assembly of claim 10 wherein the helical splines of the input shaft and first ring are oriented to allow the teeth of the first ring to disengage from the teeth of the second ring and then to be pushed axially together by the spring, a gap being provided between the drive faces of the teeth of the first ring and the drive faces of the teeth of the second ring.

14. A method of operating a drive engagement assembly for a bicycle comprising:
providing an input shaft rotatably attached to an axle, the axle having a length, an axis being defined by a centerline running through the length of the axle, the input shaft including an outer section having a helical spline, first and second rings having a plurality of engaging teeth, each of the engaging teeth having a drive face, the first ring having a helical spline matching and aligned with the helical spline of the input shaft, the second ring operably attached to a hub member;
applying a siring force axially against the first ring;
axially moving the first ring along the helical spline;
engaging the teeth of the first ring with the teeth of the second ring;
rotating the input shaft in a first direction to engage the drive faces of the teeth of the first and second rings; and
transmitting the rotation of the input shaft through the first and second rings to the hub member.

15. The method of claim 14 further comprising:
rotating the input shaft in a second direction opposite the first direction;
axially moving the first ring, away from the second ring to disengage the teeth of the first ring from the teeth of the second ring; and
applying an axial force against the first ring through the spring to force the first ring axially along the helical spline of the input shaft and against the second ring, a gap being provided between the drive faces of the teeth of the first ring and the drive faces of the teeth of the second ring.

16. The method of claim 15 further comprising:
reversing the rotation of the input shaft back to the first direction;
rotating the first ring to close the gap; and
moving the first ring axially along the helical spline of the input shaft while the gap is closed to create a clamping force.

17. The method of claim 16 wherein the teeth each have a first face defining a plane parallel to the axis and a second face defining a plane askew to the axis.

18. A drive engagement assembly for a bicycle comprising:
an input shaft rotatably attached to an axle;
a drive ring attached to the input shaft;
a driven ring engaged with the drive ring, the driven ring including a helical spline formed on an outer surface of the driven ring; and
a hubshell including a helical spline matching and aligned with the helical spline of the driven ring;
wherein the drive ring is moved axially along the helical spline to partially engage a ramp face of the drive ring with a ramp face of the driven ring, a gap provided between a driving face of the drive ring and a driving face of the driven ring.

19. The assembly of claim 18 wherein the drive ring and input shaft are formed as an integral member.

20. The assembly of claim 18 wherein the axle has a length, an axis being defined by a centerline running through the length of the axle, the drive ring and driven ring including a plurality of mating teeth, each of the teeth including a first face forming a plane parallel to the axis and a second face forming a plane askew to the axis.

21. The assembly of claim 18 further comprising a spring retained by the hubshell and applying a force axially against the driven ring.

22. A method of operating a drive engagement assembly for a bicycle comprising:

providing an input shaft rotatably attached to an axle, a drive ring attached to the input shaft, a driven ring engaged with the drive ring, and including a helical spline formed on an outer surface of the driven ring, and a hubshell including a helical spline matching the helical spline of the driven ring;

rotating the input shaft in a first direction;

transmitting the rotation through the drive ring and driven ring; and axially moving the driven ring along the helical spline of the hubshell to clamp the drive ring and driven ring together.

23. The method of claim 22 further comprising:

reversing the rotation of the input shaft; and disengaging the driven ring from the drive ring to allow the input shaft to free wheel.

24. A method of operating a drive engagement assembly for a bicycle comprising:

rotating an input shaft in a first direction;

transmitting the rotation through a first ring to a second ring;

transmitting the rotation from the second, ring to a hub member;

axially moving one of the rings along a helical path to engage with the other ring and create a clamping force; and providing a spring and applying a force axially against one of the rings along the helical path.

25. The method of claim 24 further comprising:

rotating the input shaft in a second direction opposite to the first direction; and axially moving one of the rings along the helical path to disengage the rings.

26. A method of operating a drive engagement assembly for a bicycle comprising:

providing first and second rings, each of the rings including a plurality of teeth, each of the teeth including a drive face and a ramp face, and axially moving the first ring along a helical path to partially engage the ramp faces of the teeth of the first ring with the ramp faces of the teeth of the second ring and allow a gap between the drive faces of the first and second rings.

27. The method of claim 26 further comprising rotating the input shaft; and axially moving the first ring along a helical path away from the second ring.

28. The method of claim 26 further comprising:

rotating the input shaft;

closing the gap between the drive faces; and axially moving the first ring along a helical path while the drive faces are engaged to create a clamping force between the first ring and second ring.

* * * * *

UNITED STATES PATENT AND TRADEMARK OFFICE
CERTIFICATE OF CORRECTION

PATENT NO. : 5,964,332
DATED : October 12, 1999
INVENTOR(S) : Christopher D. King It is certified that error appears in the above-identified patent and that said Letters Patent is hereby corrected as shown below:

<u>Title page,</u>
Item [56], please change the applicant's name of U.S. Patent No. 3,306,409 from "Gionetti" to -- Giometti --.

<u>Column 8,</u>
Line 13, please change the word "siring" to -- spring --.
Line 25, please delete the comma (,) after the word "ring".

Signed and Sealed this

Fourth Day of June, 2002

Attest:

JAMES E. ROGAN
Attesting Officer
Director of the United States Patent and Trademark Office